US008699135B2

(12) United States Patent
Goto et al.

(10) Patent No.: US 8,699,135 B2
(45) Date of Patent: Apr. 15, 2014

(54) METHOD OF PRODUCING POLARIZING FILM

(75) Inventors: Shusaku Goto, Ibaraki (JP); Hiroaki Sawada, Ibaraki (JP); Takeharu Kitagawa, Ibaraki (JP); Minoru Miyatake, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 15 days.

(21) Appl. No.: 13/520,248

(22) PCT Filed: Nov. 29, 2011

(86) PCT No.: PCT/JP2011/077468
§ 371 (c)(1),
(2), (4) Date: Jul. 2, 2012

(87) PCT Pub. No.: WO2012/081390
PCT Pub. Date: Jun. 21, 2012

(65) Prior Publication Data
US 2012/0281279 A1 Nov. 8, 2012

(30) Foreign Application Priority Data

Dec. 16, 2010 (JP) .................. 2010-280579
May 17, 2011 (JP) .................. 2011-110531

(51) Int. Cl.
*G02B 5/30* (2006.01)
(52) U.S. Cl.
CPC ...................... *G02B 5/305* (2013.01)
USPC .................... 359/487.02; 264/1.34
(58) Field of Classification Search
None
See application file for complete search history.

(56) References Cited

U.S. PATENT DOCUMENTS

| 6,096,375 A | 8/2000 | Ouderkirk et al. |
| 6,840,635 B2 | 1/2005 | Maeda et al. |
| 2003/0001988 A1 | 1/2003 | Maeda et al. |
| 2005/0243245 A1 | 11/2005 | Taguchi et al. |
| 2008/0007828 A1* | 1/2008 | Tsujiuchi et al. ............. 359/485 |
| 2008/0049323 A1* | 2/2008 | Sugiyama et al. ............ 359/500 |
| 2010/0232018 A1 | 9/2010 | Kobayashi et al. |

FOREIGN PATENT DOCUMENTS

| JP | 2001-343521 A | 12/2001 |
| JP | 2002-90546 A | 3/2002 |
| JP | 2002-196132 A | 7/2002 |
| JP | 2003-315542 A | 11/2003 |
| JP | 2005-284246 A | 10/2005 |
| WO | 2009/054375 A1 | 4/2009 |

OTHER PUBLICATIONS

Explanation of Circumstances Concerning Accelerated Examination issued Dec. 21, 2011, in corresponding Japanese Patent Application No. 2011-258599.
Extended European Search Report dated Oct. 18, 2013, issued in European application No. 11 84 7890.8.
* cited by examiner

*Primary Examiner* — Derek S Chapel
(74) *Attorney, Agent, or Firm* — Westerman, Hattori, Daniels & Adrian, LLP

(57) ABSTRACT

The present invention provides a method of producing a polarizing film having excellent optical characteristics. The method of producing a polarizing film of the present invention includes: forming a polyvinyl alcohol-based resin layer 12 on a thermoplastic resin substrate 11 to produce a laminate 10; dyeing the polyvinyl alcohol-based resin layer 12 of the laminate 10 with iodine; stretching the laminate 10; and covering, after the dyeing and the stretching, a surface of the polyvinyl alcohol-based resin layer 12 of the laminate 10 with a cover film having a moisture permeability of 100 g/m²·24 h or less, followed by heating of the laminate 10 under the state.

9 Claims, 4 Drawing Sheets

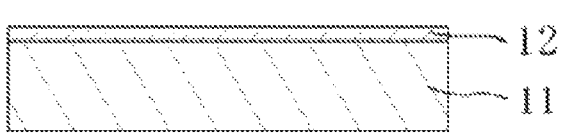
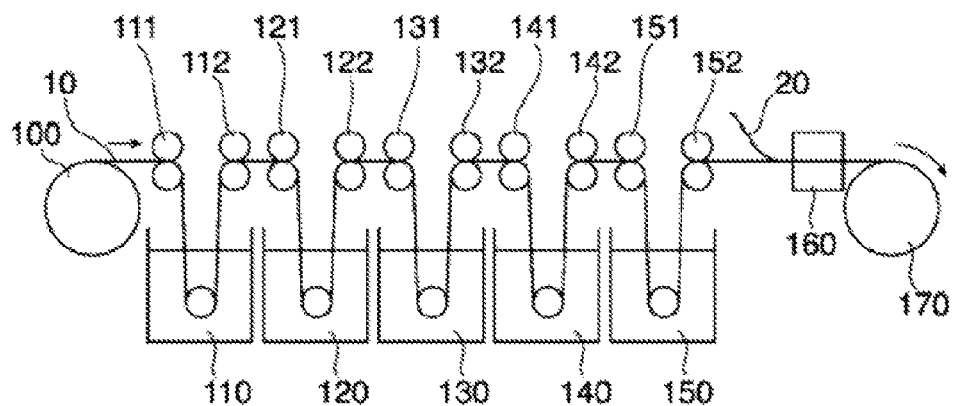

Fig. 3
(a)
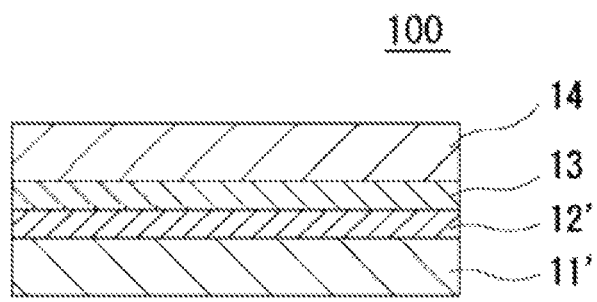
(b)
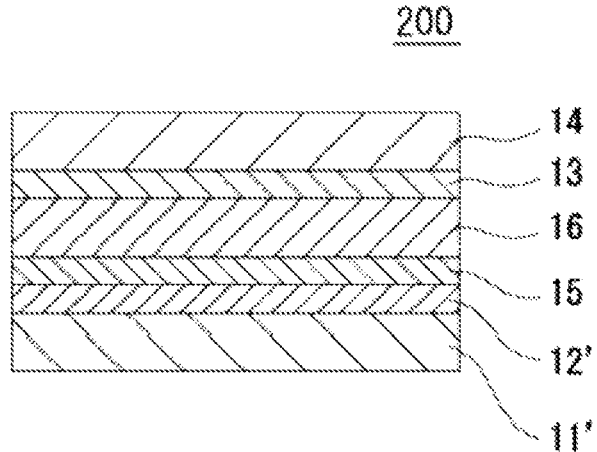

Fig. 4
(a)
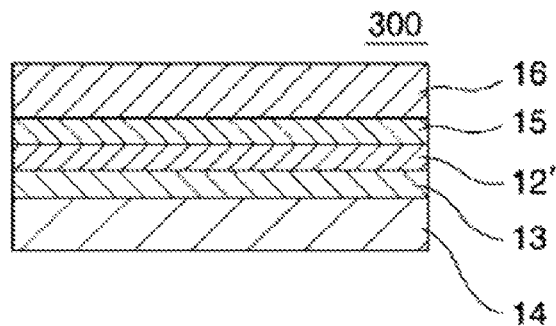
(b)
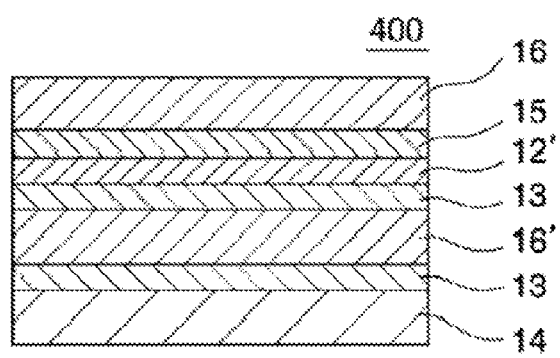
(c)
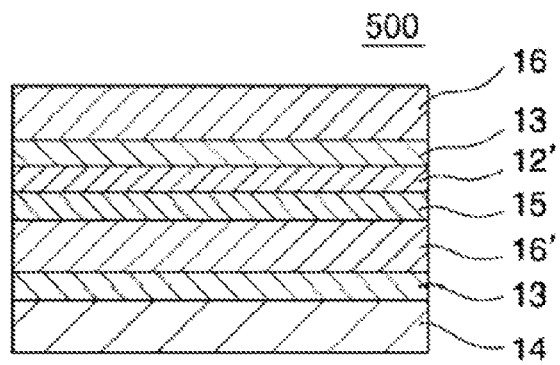
(d)
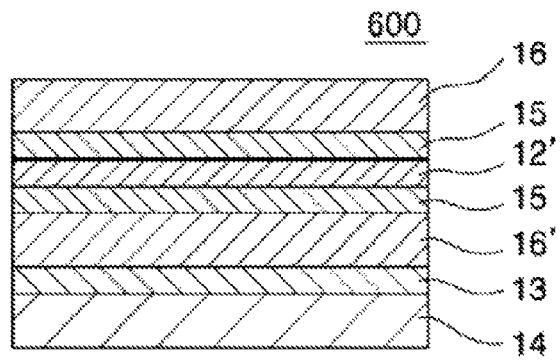

METHOD OF PRODUCING POLARIZING FILM

TECHNICAL FIELD

The present invention relates to a method of producing a polarizing film.

BACKGROUND ART

A polarizing film is placed on each of both sides of the liquid crystal cell of a liquid crystal display apparatus as a representative image display apparatus, the placement being attributable to the image-forming mode of the apparatus. For example, the following method has been proposed as a method of producing the polarizing film (for example, Patent Literature 1). A laminate having a thermoplastic resin substrate and a polyvinyl alcohol (PVA)-based resin layer is stretched, and is then immersed in a dyeing liquid so that the polarizing film may be obtained. According to such method, a polarizing film having a small thickness is obtained. Accordingly, the method has been attracting attention because of its potential to contribute to the thinning of a recent liquid crystal display apparatus. However, such method involves a problem in that the optical characteristics of the polarizing film to be obtained are insufficient.

CITATION LIST

Patent Literature

[PTL 1] JP 2001-343521 A

SUMMARY OF INVENTION

Technical Problem

The present invention has been made to solve the conventional problem, and a main object of the present invention is to provide a method of producing a polarizing film having excellent optical characteristics.

Means for Solving the Problems

According to one aspect of the present invention, a method of producing a polarizing film is provided. The method of producing a polarizing film includes forming a PVA-based resin layer on a thermoplastic resin substrate to produce a laminate, dyeing the PVA-based resin layer of the laminate with iodine, stretching the laminate and covering, after the dyeing and the stretching, a surface of the PVA-based resin layer of the laminate with a cover film having a moisture permeability of 100 g/m$^2$·24 h or less, followed by heating of the laminate under the state.

In one embodiment of the invention, the heating is performed at a temperature of 60° C. or more.

In another embodiment of the invention, the surface of the PVA-based resin layer is covered with the cover film through an adhesive.

In still another embodiment of the invention, the adhesive includes an aqueous adhesive.

In still another embodiment of the invention, the thermoplastic resin substrate after the stretching has a moisture permeability of 100 g/m$^2$·24 h or less.

In still another embodiment of the invention, the laminate is subjected to underwater stretching in an aqueous solution of boric acid.

In still another embodiment of the invention, the method of producing a polarizing film includes subjecting the laminate to aerial stretching at 95° C. or more before the dyeing and the boric acid underwater stretching.

In still another embodiment of the invention, a maximum stretching ratio of the laminate is 5.0 times or more.

In still another embodiment of the invention, the thermoplastic resin substrate is constituted of an amorphous polyethylene terephthalate-based resin.

According to another aspect of the invention, a polarizing film is provided. The polarizing film is obtained by the method of producing a polarizing film.

According to still another aspect of the invention, an optical laminate is provided. The optical laminate includes the polarizing film.

Advantageous Effects of Invention

According to the present invention, a polarizing film extremely excellent in optical characteristics can be produced by: subjecting a PVA-based resin layer formed on a thermoplastic resin substrate to a dyeing treatment and a stretching treatment; covering the surface of the PVA-based resin layer with a cover film having a moisture permeability of 100 g/m$^2$·24 h or less after the treatments; and heating the resultant under the state.

BRIEF DESCRIPTION OF DRAWINGS

FIG. 1 is a schematic sectional view of a laminate according to a preferred embodiment of the present invention.

FIG. 2 is a schematic view illustrating an example of a method of producing a polarizing film of the present invention.

FIGS. 3 are each a schematic sectional view of an optical film laminate according to a preferred embodiment of the present invention.

FIGS. 4 are each a schematic sectional view of an optical functional film laminate according to another preferred embodiment of the present invention.

DESCRIPTION OF EMBODIMENTS

Figure 5:
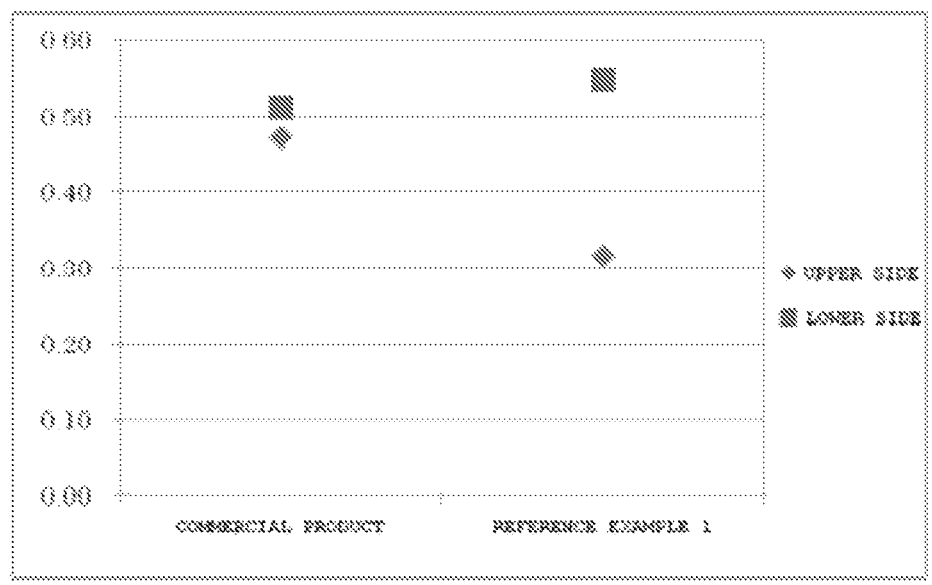
FIG. 5 is a graph illustrating the results of the evaluation of Reference Example 1 and a commercially available polarizing film for their orientation properties.

Hereinafter, preferred embodiments of the present invention are described. However, the present invention is not limited to these embodiments.

A. Production Method

A method of producing a polarizing film of the present invention includes: forming a PVA-based resin layer on a thermoplastic resin substrate to produce a laminate (step A); dyeing the PVA-based resin layer of the laminate with iodine (step B); stretching the laminate (step C); and covering the surface of the PVA-based resin layer of the laminate with a cover film, followed by heating of the laminate under the state. Hereinafter, the respective steps are described.

A-1. Step A

FIG. 1 is a schematic sectional view of a laminate according to a preferred embodiment of the present invention. A laminate 10 has a thermoplastic resin substrate 11 and a PVA-based resin layer 12, and is produced by forming the PVA-based resin layer 12 on the thermoplastic resin substrate 11. Any appropriate method can be adopted as a method of forming the PVA-based resin layer 12. The PVA-based resin layer 12 is preferably formed by applying an application liquid containing a PVA-based resin onto the thermoplastic resin substrate 11 and drying the liquid.

Any appropriate material can be adopted as a constituent material for the thermoplastic resin substrate. Amorphous (uncrystallized) polyethylene terephthalate-based resins are each preferably used as the constituent material for the thermoplastic resin substrate. Of those, a noncrystalline (hard-to-crystallize) polyethylene terephthalate-based resin is particularly preferably used. Specific examples of the noncrystalline polyethylene terephthalate-based resin include a copolymer further containing isophthalic acid as a dicarboxylic acid and a copolymer further containing cyclohexane dimethanol as a glycol.

When an underwater stretching mode is adopted in the step C to be described later, the thermoplastic resin substrate absorbs water and the water serves a plastic function so that the substrate can plasticize. As a result, a stretching stress can be significantly reduced. Accordingly, the stretching can be performed at a high ratio and the stretchability of the thermoplastic resin substrate can be more excellent than that at the time of aerial stretching. As a result, a polarizing film having excellent optical characteristics can be produced. In one embodiment, the percentage of water absorption of the thermoplastic resin substrate is preferably 0.2% or more, more preferably 0.3% or more. Meanwhile, the percentage of water absorption of the thermoplastic resin substrate is preferably 3.0% or less, more preferably 1.0% or less. The use of such thermoplastic resin substrate can prevent, for example, the following inconvenience. The dimensional stability of the thermoplastic resin substrate remarkably reduces at the time of the production and hence the external appearance of the polarizing film to be obtained deteriorates. In addition, the use can prevent the rupture of the substrate at the time of the underwater stretching and the release of the PVA-based resin layer from the thermoplastic resin substrate. It should be noted that the percentage of water absorption of the thermoplastic resin substrate can be adjusted by, for example, introducing a denaturation group into the constituent material. The percentage of water absorption is a value determined in conformity with JIS K 7209.

The glass transition temperature (Tg) of the thermoplastic resin substrate is preferably 170° C. or less. The use of such thermoplastic resin substrate can sufficiently secure the stretchability of the laminate while suppressing the crystallization of the PVA-based resin layer. Further, the glass transition temperature is more preferably 120° C. or less in consideration of the plasticization of the thermoplastic resin substrate by water and favorable performance of the underwater stretching. In one embodiment, the glass transition temperature of the thermoplastic resin substrate is preferably 60° C. or more. The use of such thermoplastic resin substrate prevents an inconvenience such as the deformation of the thermoplastic resin substrate (e.g., the occurrence of unevenness, a slack, or a wrinkle) during the application and drying of the application liquid containing the PVA-based resin, thereby enabling favorable production of the laminate. In addition, the use enables favorable stretching of the PVA-based resin layer at a suitable temperature (e.g., about 60° C.) In another embodiment, a glass transition temperature lower than 60° C. is permitted as long as the thermoplastic resin substrate does not deform during the application and drying of the application liquid containing the PVA-based resin. It should be noted that the glass transition temperature of the thermoplastic resin substrate can be adjusted by, for example, introducing a denaturation group into the constituent material or heating the substrate constituted of a crystallization material. The glass transition temperature (Tg) is a value determined in conformity with JIS K 7121.

The thickness of the thermoplastic resin substrate before the stretching is preferably 20 μm to 300 μm, more preferably 50 μm to 200 μm. When the thickness is less than 20 μm, it may be difficult to form the PVA-based resin layer. When the thickness exceeds 300 μm, in, for example, the step C, it may take a long time for the thermoplastic resin substrate to absorb water, and an excessively large load may be needed in the stretching.

Any appropriate resin can be adopted as the PVA-based resin. Examples of the resin include a polyvinyl alcohol and an ethylene-vinyl alcohol copolymer. The polyvinyl alcohol is obtained by saponifying a polyvinyl acetate. The ethylene-vinyl alcohol copolymer is obtained by saponifying an ethylene-vinyl acetate copolymer. The saponification degree of the PVA-based resin is typically 85 mol % to 100 mol %, preferably 95.0 mol % to 99.95 mol %, more preferably 99.0 mol % to 99.93 mol %. The saponification degree can be determined in conformity with JIS K 6726-1994. The use of the PVA-based resin having such saponification degree can provide a polarizing film excellent in durability. When the saponification degree is excessively high, the resin may gel.

The average polymerization degree of the PVA-based resin can be appropriately selected depending on purposes. The average polymerization degree is typically 1,000 to 10,000, preferably 1,200 to 4,500, more preferably 1,500 to 4,300. It should be noted that the average polymerization degree can be determined in conformity with JIS K 6726-1994.

The application liquid is representatively a solution prepared by dissolving the PVA-based resin in a solvent. Examples of the solvent include water, dimethylsulfoxide, dimethylformamide, dimethylacetamide, N-methylpyrrolidone, various glycols, polyhydric alcohols such as trimethylolpropane, and amines such as ethylenediamine and diethylenetriamine. One kind of those solvents can be used alone, or two or more kinds thereof can be used in combination. Of those, water is preferred. The concentration of the PVA-based resin of the solution is preferably 3 parts by weight to 20 parts by weight with respect to 100 parts by weight of the solvent. At such resin concentration, a uniform coating film in close contact with the thermoplastic resin substrate can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive can be used for the purpose of additionally improving the uniformity, dyeing property, or stretchability of the PVA-based resin layer to be obtained.

Any appropriate method can be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The application liquid is preferably applied and dried at a temperature of 50° C. or more.

The thickness of the PVA-based resin layer before the stretching is preferably 3 μm to 40 μm, more preferably 3 μm to 20 μm.

The thermoplastic resin substrate may be subjected to a surface treatment (such as a corona treatment) before the formation of the PVA-based resin layer. Alternatively, an easy-adhesion layer may be formed on the thermoplastic resin substrate. Performing such treatment can improve adhesiveness between the thermoplastic resin substrate and the PVA-based resin layer.

A-2. Step B

In the step B, the PVA-based resin layer is dyed with iodine. Specifically, the dyeing is performed by causing the PVA-based resin layer to adsorb iodine. A method for the adsorption is, for example, a method involving immersing the PVA-based resin layer (laminate) in a dyeing liquid containing iodine, a method involving applying the dyeing liquid to the PVA-based resin layer, or a method involving spraying the dyeing liquid on the PVA-based resin layer. Of those, the method involving immersing the laminate in the dyeing liquid is preferred. This is because iodine can favorably adsorb to the layer.

The dyeing liquid is preferably an aqueous solution of iodine. The compounding amount of iodine is preferably 0.1 part by weight to 0.5 part by weight with respect to 100 parts by weight of water. The aqueous solution of iodine is preferably compounded with an iodide in order that the solubility of iodine in water may be increased. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The compounding amount of the iodide is preferably 0.02 part by weight to 20 parts by weight, more preferably 0.1 part by weight to 10 parts by weight with respect to 100 parts by weight of water. The liquid temperature of the dyeing liquid at the time of the dyeing is preferably 20° C. to 50° C. in order that the dissolution of the PVA-based resin may be suppressed. When the PVA-based resin layer is immersed in the dyeing liquid, an immersion time is preferably 5 seconds to 5 minutes in order that the transmittance of the PVA-based resin layer may be secured. In addition, the dyeing conditions (the concentration, the liquid temperature, and the immersion time) can be set so that the polarization degree or single axis transmittance of the polarizing film to be finally obtained may fall within a predetermined range. In one embodiment, the immersion time is set so that the polarization degree of the polarizing film to be obtained may be 99.98% or more. In another embodiment, the immersion time is set so that the single axis transmittance of the polarizing film to be obtained may be 40% to 44%.

The step B may be performed before the step C to be described later, or may be performed after the step C. As described later, when the underwater stretching mode is adopted in the step C, the step B is preferably performed before the step C.

A-3. Step C

In the step C, the laminate is stretched. Any appropriate method can be adopted as a method of stretching the laminate. Specifically, fixed-end stretching may be adopted, or free-end stretching (such as a method involving passing the laminate between rolls having different peripheral speeds to uniaxially stretch the laminate) may be adopted. The stretching of the laminate may be performed in one stage, or may be performed in a plurality of stages. When the stretching is performed in a plurality of stages, the stretching ratio (maximum stretching ratio) of the laminate to be described later is the product of stretching ratios in the respective stages.

A stretching mode is not particularly limited and may be an aerial stretching mode, or may be the underwater stretching mode. Of those, the underwater stretching mode is preferred. According to the underwater stretching mode, the stretching can be performed at a temperature lower than the glass transition temperature (representatively about 80° C.) of each of the thermoplastic resin substrate and the PVA-based resin layer, and hence the PVA-based resin layer can be stretched at a high ratio while its crystallization is suppressed. As a result, a polarizing film having excellent optical characteristics can be produced.

The stretching temperature of the laminate can be set to any appropriate value depending on, for example, a formation material for the thermoplastic resin substrate and the stretching mode. When the aerial stretching mode is adopted, the stretching temperature is preferably equal to or higher than the glass transition temperature (Tg) of the thermoplastic resin substrate, more preferably higher than the glass transition temperature (Tg) of the thermoplastic resin substrate by 10° C. or more, particularly preferably higher than the Tg by 15° C. or more. Meanwhile, the stretching temperature of the laminate is preferably 170° C. or less. Performing the stretching at such temperature suppresses rapid progress of the crystallization of the PVA-based resin, thereby enabling the suppression of an inconvenience due to the crystallization (such as the inhibition of the orientation of the PVA-based resin layer by the stretching).

when the underwater stretching mode is adopted as a stretching mode, the liquid temperature of a stretching bath is preferably 40° C. to 85° C., more preferably 50° C. to 85° C. At such temperature, the PVA-based resin layer can be stretched at a high ratio while its dissolution is suppressed. Specifically, as described above, the glass transition temperature (Tg) of the thermoplastic resin substrate is preferably 60° C. or more in relation to the formation of the PVA-based resin layer. In this case, when the stretching temperature falls short of 40° C., there is a possibility that the stretching cannot be favorably performed even in consideration of the plasticization of the thermoplastic resin substrate by water. On the other hand, as the temperature of the stretching bath increases, the solubility of the PVA-based resin layer is raised and hence excellent optical characteristics may not be obtained.

When the underwater stretching mode is adopted, the laminate is preferably stretched by being immersed in an aqueous solution of boric acid (boric acid underwater stretching). The use of the aqueous solution of boric acid as the stretching bath can impart, to the PVA-based resin layer, rigidity enough to withstand a tension to be applied at the time of the stretching and such water resistance that the layer does not dissolve in water. Specifically, boric acid can produce a tetrahydroxyborate anion in the aqueous solution to cross-link with the PVA-based resin through a hydrogen bond. As a result, the PVA-based resin layer can be favorably stretched with the aid of the rigidity and the water resistance imparted thereto, and hence a polarizing film having excellent optical characteristics can be produced.

The aqueous solution of boric acid is preferably obtained by dissolving boric acid and/or a borate in water as a solvent. The concentration of boric acid is preferably 1 part by weight to 10 parts by weight with respect to 100 parts by weight of water. Setting the concentration of boric acid to 1 part by weight or more can effectively suppress the dissolution of the PVA-based resin layer, thereby enabling the production of a polarizing film having additionally high characteristics. It should be noted that an aqueous solution obtained by dissolving a boron compound such as borax, glyoxal, glutaric aldehyde, or the like as well as boric acid or the borate in the solvent can also be used.

The stretching bath (aqueous solution of boric acid) is preferably compounded with an iodide. Compounding the bath with the iodide can suppress the elution of iodine which the PVA-based resin layer has been caused to adsorb. Specific examples of the iodide are as described above. The concentration of the iodide is preferably 0.05 part by weight to 15 parts by weight, more preferably 0.5 part by weight to 8 parts by weight with respect to 100 parts by weight of water.

The laminate is preferably immersed in the stretching bath for a time of 15 seconds to 5 minutes.

The stretching ratio (maximum stretching ratio) of the laminate is preferably 5.0 times or more with respect to the original length of the laminate. Such high stretching ratio can be achieved by adopting, for example, the underwater stretching mode (boric acid underwater stretching). It should be noted that the term "maximum stretching ratio" as used in the description refers to a stretching ratio immediately before the rupture of the laminate. The stretching ratio at which the laminate ruptures is separately identified and a value lower than the value by 0.2 is the maximum stretching ratio.

A-4. Step D

After the step B and the step C, in the step D, the surface of the PVA-based resin layer of the laminate is covered with a cover film, and then the laminate is heated under the state. Subjecting the PVA-based resin layer of the laminate to such treatment can improve the optical characteristics of the polarizing film to be obtained. One possible factor for the improvements of the optical characteristics is that an iodine complex having low orientation property which contributes to the optical characteristics to a small extent can be selectively decomposed by the step D. Specifically, the thermoplastic resin substrate side (lower side) and surface side (upper side) of the PVA-based resin layer that has been formed on the thermoplastic resin substrate, and has undergone the dyeing step and the stretching step are different from each other in construction. Specifically, the lower side and the upper side are different from each other in orientation property of the PVA-based resin, and the orientation property of the upper side tends to be lower than that of the lower side. The orientation property of the iodine complex present in the portion having the lower orientation property is also low. Accordingly, the complex not only contributes to the optical characteristics (especially a polarization degree) to a small extent but also can be responsible for the reductions of the optical characteristics (especially a transmittance). On the other hand, such iodine complex has a weak bonding strength because of its low orientation property, and is hence easily decomposed. As a result, the iodine complex having low orientation property is selectively decomposed by the step D so that absorption in a visible light region may be reduced. Thus, the transmittance can be increased. It should be noted that as the iodine complex having low orientation property originally contributes to the polarization degree to a small extent, the reduction of the polarization degree is minimized even when the complex is decomposed.

Any appropriate resin film can be adopted as the cover film. Its moisture permeability is preferably 100 g/m²·24 h or less, more preferably 90 g/m²·24 h or less. Such cover film enables the performance of the heating treatment in a state where moisture present in the PVA-based resin layer is held in the layer. When the heating is performed in the presence of moisture, the iodine complex (having low orientation property) that has been made water-soluble is particularly easily decomposed and can be decomposed into an iodine ion. As a result, the absorption in the visible light region of the polarizing film to be obtained reduces and hence the transmittance can increase. Here, the moisture permeability of the thermoplastic resin substrate is preferably as low as possible because a larger amount of moisture present in the PVA-based resin layer can be held. The moisture permeability of the thermoplastic resin substrate after the stretching step (step C) is preferably 100 g/m²·24 h or less, more preferably 90 g/m²·24 h or less. It should be noted that the term "moisture permeability" refers to a value determined by measuring the amount (g) of water vapor, which passes a sample having an area of 1 m² within 24 hours in an atmosphere having a temperature of 40° C. and a humidity of 92% RH, in conformity with the moisture permeability test (cup method) of JIS Z0208.

Any appropriate material capable of satisfying the moisture permeability can be adopted as a constituent material for the cover film. Examples of the constituent material for the cover film include cycloolefin-based resins such as a norbornene-based resin, olefin-based resins such as a polyethylene and a polypropylene, polyester-based resins, and (meth) acrylic resins. It should be noted that the term "(meth)acrylic resins" refers to acrylic resins and/or methacrylic resins.

The thickness of the cover film can be set to a thickness capable of satisfying the moisture permeability. The thickness is representatively 10 μm to 100 μm.

In a preferred embodiment, the surface of the PVA-based resin layer is covered with the cover film through an adhesive. The use of the adhesive prevents the occurrence of a gap between the PVA-based resin layer and the cover film, and hence can improve adhesiveness therebetween. As a result, the iodine complex having low orientation property can be efficiently decomposed. Any appropriate adhesive is used as the adhesive, and the adhesive may be an aqueous adhesive, or may be a solvent-based adhesive. Of those, the aqueous adhesive is preferably used. Moisture in the aqueous adhesive can migrate to the PVA-based resin layer. Thus, the stability of the iodine complex reduces. In particular, the iodine complex having low orientation property is brought into such a state as to be easily decomposed because its original stability is low. As a result, the decomposition of the iodine complex having low orientation property can be selectively promoted.

Any appropriate aqueous adhesive can be adopted as the aqueous adhesive. An aqueous adhesive containing a PVA-based resin is preferably used. The average polymerization degree of the PVA-based resin in the aqueous adhesive is preferably about 100 to 5,000, more preferably 1,000 to 4,000 in terms of adhesion. Its average saponification degree is preferably about 85 mol % to 100 mol %, more preferably 90 mol % to 100 mol % in terms of adhesion.

The PVA-based resin in the aqueous adhesive preferably contains an acetoacetyl group. This is because such resin can be excellent in adhesiveness between the PVA-based resin layer and the cover film, and in durability. The acetoacetyl group-containing PVA-based resin is obtained by, for example, causing a PVA-based resin and diketene to react with each other by any appropriate method. The acetoacetyl group denaturation degree of the acetoacetyl group-containing PVA-based resin is representatively 0.1 mol % or more, preferably about 0.1 mol % to 40 mol %, more preferably 1 mol % to 20 mol %, particularly preferably 2 mol % to 7 mol %. It should be noted that the acetoacetyl group denaturation degree is a value measured by NMR.

The resin concentration of the aqueous adhesive is preferably 0.1 wt % to 15 wt %, more preferably 0.5 wt % to 10 wt %.

Specifically, the adhesive is applied to the surface of the PVA-based resin layer before the cover film is attached. The thickness of the adhesive at the time of the application can be set to any appropriate value. For example, the thickness is set so that an adhesive layer having a desired thickness may be obtained after heating (drying). The thickness of the adhesive layer is preferably 10 nm to 300 nm, more preferably 10 nm to 200 nm, particularly preferably 20 nm to 150 nm. Upon attachment of the cover film, a moisture content per unit area in the adhesive is preferably 0.05 mg/cm² or more. When such moisture content is satisfied, the iodine complex having low orientation property can be efficiently decomposed. Meanwhile, the moisture content is preferably 2.0 mg/cm$^2$ or less, more preferably 1.0 mg/cm$^2$ or less. This is because it may take a long time to dry the adhesive. A preferred procedure is as described below. The laminate is dried before the step D. After the drying, the adhesive is applied to the surface of the PVA-based resin layer before the cover film is attached. Then, the PVA-based resin layer is heated in a state where the adhesive contains water. The moisture content per unit area in the adhesive is as described above, and the moisture content is determined from the moisture content in the adhesive and the amount of the adhesive applied to the surface of the PVA-based resin layer.

The laminate covered with the cover film is heated at a temperature of preferably 50° C. or more, more preferably 55° C. or more, still more preferably 60° C. or more, particularly preferably 80° C. or more. Heating the laminate at such temperature can efficiently decompose the iodine complex. Meanwhile, the heating temperature is preferably 120° C. or less. A heating time is preferably 3 minutes to 10 minutes.

The presence of an iodine ion (I$^-$) produced by the decomposition of the iodine complex can be confirmed by measuring an absorbance at a maximum wavelength $\lambda_{max}$ of 220 nm. The percentage by which the parallel absorbance of the PVA-based resin layer at a wavelength of 220 nm increases after the treatment by the step D as compared with that before the treatment is preferably 3% or more, more preferably 5% or more. It should be noted that the parallel absorbance of the PVA-based resin layer is determined from $\log_{10}$ (1/parallel transmittance), the parallel transmittance being the parallel transmittance of the laminate measured with an ultraviolet-visible-near-infrared spectrophotometer (V7100 manufactured by JASCO Corporation), and the increase percentage is calculated from the following equation.

(Increase percentage)=((absorbance after treatment)−(absorbance before treatment))/(absorbance after treatment)×100

A-5. Any Other Step

The method of producing a polarizing film of the present invention can include any other step except the step A, the step B, the step C, and the step D. Examples of the other step include an in solubilizing step, a cross-linking step, a stretching step different from the step C, a washing step, and a drying step. The other step can be performed at any appropriate timing.

The insolubilizing step is representatively performed by immersing the PVA-based resin layer in an aqueous solution of boric acid. Particularly when the underwater stretching mode is adopted, water resistance can be imparted to the PVA-based resin layer by subjecting the layer to an insolubilizing treatment. The concentration of the aqueous solution of boric acid is preferably 1 part by weight to 4 parts by weight with respect to 100 parts by weight of water. The liquid temperature of an insolubilizing bath (the aqueous solution of boric acid) is preferably 20° C. to 40° C. The insolubilizing step is preferably performed after the production of the laminate and before the step B or the step C.

The cross-linking step is representatively performed by immersing the PVA-based resin layer in an aqueous solution of boric acid. Water resistance can be imparted to the PVA-based resin layer by subjecting the layer to a cross-linking treatment. The concentration of the aqueous solution of boric acid is preferably 1 part by weight to 4 parts by weight with respect to 100 parts by weight of water. In addition, when the cross-linking step is performed after the dyeing step, the solution is preferably further compounded with an iodide. Compounding the solution with the iodide can suppress the elution of iodine which the PVA-based resin layer has been caused to adsorb. The compounding amount of the iodide is preferably 1 part by weight to 5 parts by weight with respect to 100 parts by weight of water. Specific examples of the iodide are as described above. The liquid temperature of a cross-linking bath (the aqueous solution of boric acid) is preferably 20° C. to 50° C.

The cross-linking step is preferably performed before the step C. In a preferred embodiment, the step B, the cross-linking step, and the step C are performed in the stated order.

The stretching step different from the step C is, for example, a step of subjecting the laminate to aerial stretching at a high temperature (e.g., 95° C. or more). Such aerial stretching step is preferably performed before the boric acid underwater stretching (step C) and the dyeing step. Such aerial stretching step is hereinafter referred to as "aerial auxiliary stretching" because the step can be ranked as stretching preliminary or auxiliary to the boric acid underwater stretching.

When the aerial auxiliary stretching is combined with the boric acid underwater stretching, the laminate can be stretched at an additionally high ratio in some cases. As a result, a polarizing film having additionally excellent optical characteristics (such as a polarization degree) can be produced. For example, when a polyethylene terephthalate-based resin is used as the thermoplastic resin substrate, the thermoplastic resin substrate can be stretched favorably, while its orientation is suppressed, by a combination of the aerial auxiliary stretching and the boric acid underwater stretching than that in the case of the boric acid underwater stretching alone. As the orientation property of the thermoplastic resin substrate is raised, its stretching tension increases and hence it becomes difficult to stably stretch the substrate or the thermoplastic resin substrate ruptures. Accordingly, the laminate can be stretched at an additionally high ratio by stretching the thermoplastic resin substrate while suppressing its orientation.

In addition, when the aerial auxiliary stretching is combined with the boric acid underwater stretching, the orientation property of the PVA-based resin is improved and hence the orientation property of the PVA-based resin can be improved even after the boric acid under water stretching. Specifically, the orientation property of the PVA-based resin is improved in advance by the aerial auxiliary stretching so that the PVA-based resin may easily cross-link with boric acid during the boric acid underwater stretching. Then, the stretching is performed in a state where boric acid serves as a junction, and hence the orientation property of the PVA-based resin is assumed to be high even after the boric acid underwater stretching. As a result, a polarizing film having excellent optical characteristics (such as a polarization degree) can be produced.

As with the step C, a stretching method for the aerial auxiliary stretching may be fixed-end stretching, or may be free-end stretching (such as a method involving passing the laminate between rolls having different peripheral speeds to uniaxially stretch the laminate). In addition, the stretching may be performed in one stage, or may be performed in a plurality of stages. When the stretching is performed in a plurality of stages, a stretching ratio to be described later is the product of stretching ratios in the respective stages. It is preferred that a stretching direction in the step be substantially the same as the stretching direction in the step C.

The stretching ratio in the aerial auxiliary stretching is preferably 3.5 times or less. A stretching temperature in the aerial auxiliary stretching is preferably equal to or higher than the glass transition temperature of the PVA-based resin. The stretching temperature is preferably 95° C. to 150° C. It should be noted that the maximum stretching ratio when the aerial auxiliary stretching and the boric acid underwater stretching are combined with each other is preferably 5.0 times or more, more preferably 5.5 times or more, still more preferably 6.0 times or more with respect to the original length of the laminate.

The washing step is representatively performed by immersing the PVA-based resin layer in an aqueous solution of potassium iodide. A drying temperature in the drying step is preferably 30° C. to 100° C. It should be noted that the step D may also serve as the drying step.

FIG. 2 is a schematic view illustrating an example of the method of producing a polarizing film of the present invention. The laminate 10 is fed from a feeding portion 100, and is then immersed in a bath 110 of an aqueous solution of boric acid by rolls 111 and 112 (the insolubilizing step). After that, the laminate is immersed in a bath 120 of an aqueous solution of a dichromatic substance (iodine) and potassium iodide by rolls 121 and 122 (the step B). Next, the laminate is immersed in a bath 130 of an aqueous solution of boric acid and potassium iodide by rolls 131 and 132 (the cross-linking step). After that, the laminate 10 is stretched through the application of a tension in its longitudinal direction (lengthwise direction) with rolls 141 and 142 having different speed ratios while being immersed in a bath 140 of an aqueous solution of boric acid (the step C). The laminate (optical film laminate) 10 subjected to the stretching treatment is immersed in a bath 150 of an aqueous solution of potassium iodide by rolls 151 and 152 (the washing step), and is then subjected to the drying step (not shown). After that, the surface of the PVA-based resin layer is covered with a cover film 20. The resultant is heated in a thermostatic zone 160 held at a predetermined temperature (the step D) and then wound by a winding portion 170.

B. Polarizing Film

A polarizing film of the present invention is obtained by the production method. The polarizing film of the present invention is substantially a PVA-based resin film that adsorbs and orients a dichromatic substance. The thickness of the polarizing film is representatively 25 μm or less, preferably 15 μm or less, more preferably 10 μm or less, still more preferably 7 μm or less, particularly preferably 5 μm or less. Meanwhile, the thickness of the polarizing film is preferably 0.5 μm or more, more preferably 1.5 μm or more. The polarizing film preferably shows absorption dichroism at any wavelength in the wavelength range of 380 nm to 780 nm. The single axis transmittance of the polarizing film is preferably 40.0% or more, more preferably 41.0% or more, still more preferably 42.0% or more, particularly preferably 43.0% or more. The polarization degree of the polarizing film is preferably 99.8% or more, more preferably 99.9% or more, still more preferably 99.95% or more.

Any appropriate method can be adopted as a usage of the polarizing film. Specifically, the polarizing film may be used in a state of being integrated with the thermoplastic resin substrate and/or the cover film, or may be used after the release of the thermoplastic resin substrate and/or the cover film. When the cover film is not released, the cover film can be used as an optical functional film to be described later.

C. Optical Laminate

An optical laminate of the present invention has the polarizing film. FIGS. 3(a) and 3(b) are each a schematic sectional view of an optical film laminate according to a preferred embodiment of the present invention. An optical film laminate 100 has a thermoplastic resin substrate 11', a polarizing film 12', a pressure-sensitive adhesive layer 13, and a separator 14 in the stated order. An optical film laminate 200 has the thermoplastic resin substrate 11', the polarizing film 12', an adhesive layer 15, an optical functional film 16, the pressure-sensitive adhesive layer 13, and the separator 14 in the stated order. In this embodiment, the thermoplastic resin substrate is directly used as an optical member without being released from the resultant polarizing film 12'. The thermoplastic resin substrate 11' can function as, for example, a protective film for the polarizing film 12'.

FIGS. 4(a), 4(b), 4(c), and 4(d) are each a schematic sectional view of an optical functional film laminate according to another preferred embodiment of the present invention. An optical functional film laminate 300 has the separator 14, the pressure-sensitive adhesive layer 13, the polarizing film 12', the adhesive layer 15, and the optical functional film 16 in the stated order. An optical functional film laminate 400 has, in addition to the construction of the optical functional film laminate 300, a second optical functional film 16' provided between the polarizing film 12' and the separator 14 through the pressure-sensitive adhesive layer 13. An optical functional film laminate 500 is such that the optical functional film 16 is laminated on the polarizing film 12' through the pressure-sensitive adhesive layer 13, and the second optical functional film 16' is laminated on the polarizing film 12' through the adhesive layer 15. An optical functional film laminate 600 is such that the optical functional film 16 and the second optical functional film 16' are each laminated on the polarizing film 12' through the adhesive layer 15. In this embodiment, the thermoplastic resin substrate has been removed.

The lamination of the respective layers constructing the optical laminate of the present invention is not limited to the illustrated examples, and any appropriate pressure-sensitive adhesive layer or adhesive layer is used. The pressure-sensitive adhesive layer is representatively formed of an acrylic pressure-sensitive adhesive. The adhesive layer is representatively formed of a PVA-based adhesive. The optical functional film can function as, for example, a protective film for a polarizing film or a retardation film.

EXAMPLES

Hereinafter, the present invention is specifically described by way of examples. However, the present invention is not limited by these examples. It should be noted that methods of measuring the respective characteristics are as described below.

1. Thickness

Measurement was performed with a digital micrometer (manufactured by Anritsu Corporation, product name: "KC-351C").

2. Glass Transition Temperature (Tg)

Measurement was performed in conformity with JIS K 7121.

3. Moisture Permeability

The amount (g) of water vapor, which passed a sample having an area of 1 $m^2$ within 24 hours in an atmosphere having a temperature of 40° C. and a humidity of 92% RH, was measured in conformity with the moisture permeability test (cup method) of JIS Z0208.

Example 1-1

(Step A)

An amorphous polyethylene terephthalate (A-PET) film (manufactured by Mitsubishi Chemical Corporation, trade name: "NOVACLEAR," thickness: 100 μm) having a percentage of water absorption of 0.60% and a Tg of 80° C. was used as a thermoplastic resin substrate.

An aqueous solution of a polyvinyl alcohol (PVA) resin (manufactured by The Nippon Synthetic Chemical Industry Co., Ltd., trade name: "Gohsenol (trademark) NH-26") having a polymerization degree of 2,600 and a saponification degree of 99.9% was applied to one surface of the thermoplastic resin substrate, and was then dried at 60° C. so that a PVA-based resin layer having a thickness of 7 μm was formed. Thus, a laminate was produced.

The resultant laminate was immersed in an insolubilizing bath having a liquid temperature of 30° C. (an aqueous solution of boric acid obtained by compounding 100 parts by weight of water with 4 parts by weight of boric acid) for 30 seconds (the insolubilizing step).

Next, the laminate was immersed in a dyeing bath having a liquid temperature of 30° C. (an aqueous solution of iodine obtained by compounding 100 parts by weight of water with 0.2 part by weight of iodine and 1.0 part by weight of potassium iodide) for 60 seconds (the step B).

Next, the laminate was immersed in a cross-linking bath having a liquid temperature of 30° C. (an aqueous solution of boric acid obtained by compounding 100 parts by weight of water with 3 parts by weight of potassium iodide and 3 parts by weight of boric acid) for 30 seconds (the cross-linking step).

After that, the laminate was uniaxially stretched in its longitudinal direction (lengthwise direction) between rolls having different peripheral speeds while being immersed in an aqueous solution of boric acid having a liquid temperature of 60° C. (an aqueous solution obtained by compounding 100 parts by weight of water with 4 parts by weight of boric acid and 5 parts by weight of potassium iodide) (the step C). The laminate was immersed in the aqueous solution of boric acid for a time of 120 seconds, and was stretched immediately before its rupture (the maximum stretching ratio was 5.0 times).

After that, the laminate was immersed in a washing bath (an aqueous solution obtained by compounding 100 parts by weight of water with 3 parts by weight of potassium iodide), and was then dried with warm air at 60° C. (the washing and drying step).

Subsequently, an aqueous solution of a PVA-based resin (manufactured by The Nippon Synthetic Chemical Industry Co., Ltd., trade name: "Gohsefimer (trademark) Z-200," resin concentration: 3 wt %) was applied to the surface of the PVA-based resin layer of the laminate so that the thickness of an adhesive layer after heating was 90 nm. A norbornene-based resin film (manufactured by ZEON CORPORATION, trade name: "ZEONOR ZB14," thickness: 70 μm, moisture permeability: 7 g/m²·24 h) was attached to the resultant, and then the whole was heated in an oven maintained at 100° C. for 5 minutes (the step D). At the time of the attachment, the moisture content per unit area in the adhesive was 0.3 mg/cm².

Thus, a polarizing film having a thickness of 3 μm was produced. In addition, the thermoplastic resin substrate at this time had a thickness of 40 μm and a moisture permeability of 25 g/m²·24 h. It should be noted that the moisture permeability is a value obtained by subjecting a separately prepared A-PET film having a thickness of 40 μm to measurement.

Example 1-2

A polarizing film was produced in the same manner as in Example 1-1 except that the heating temperature in the step D was changed to 80° C.

Example 1-3

A polarizing film was produced in the same manner as in Example 1-1 except that a norbornene-based resin film (manufactured by ZEON CORPORATION, trade name: "Zeonor ZD12," thickness: 33 μm, moisture permeability: 20 g/m²·24 h) was used as a cover film.

Example 1-4

A polarizing film was produced in the sane manner as in Example 1-1 except that a norbornene-based resin film (manufactured by ZEON CORPORATION, trade name: "ZEONOR G film ZF14," thickness: 23 μm, moisture permeability: 27 g/m²·24 h) was used as a cover film.

Example 1-5

A polarizing film was produced in the same manner as in Example 1-1 except that a polyester-based resin film (manufactured by Mitsubishi Chemical Corporation, trade name: "T100," thickness: 25 μm, moisture permeability: 29 g/m²·24 h) was used as a cover film.

Example 1-6

A polarizing film was produced in the same manner as in Example 1-1 except that a norbornene-based resin film (manufactured by JSR Corporation, trade name: "ARTON," thickness: 35 μm, moisture permeability: 85 g/m²·24 h) was used as a cover film.

Example 1-7

A polarizing film was produced in the same manner as in Example 1-1 except that the heating temperature in the step D was changed to 50° C.

Example 2-1

(Step A)
Anorbornene-based resin film (manufactured by JSR Corporation, trade name: "ARTON," thickness: 150 μm) having a Tg of 130° C. was used as a thermoplastic resin substrate.

An aqueous solution of a polyvinyl alcohol (PVA) resin (manufactured by The Nippon Synthetic Chemical Industry Co., Ltd., trade name: "Gohsenol (trademark) NH-26") having a polymerization degree of 2,600 and a saponification degree of 99.9% was applied to one surface of the thermoplastic resin substrate, and was then dried at 80° C. so that a PVA-based resin layer having a thickness of 7 μm was formed. Thus, a laminate was produced.

The resultant laminate was stretched in its widthwise direction at a stretching ratio of up to 4.5 times under heating at 140° C. with a tenter apparatus by free-end uniaxial stretching. The thickness of the PVA-based resin layer after the stretching treatment was 3 μm (the step C).

Next, the laminate was immersed in a dyeing bath having a liquid temperature of 30° C. (an aqueous solution of iodine obtained by compounding 100 parts by weight of water with 0.5 part by weight of iodine and 3.5 parts by weight of potassium iodide) for 60 seconds (the step B).

Next, the laminate was immersed in a cross-linking bath having a liquid temperature of 60° C. (an aqueous solution of boric acid obtained by compounding 100 parts by weight of water with 5 parts by weight of potassium iodide and 5 parts by weight of boric acid) for 60 seconds (the cross-linking step).

After that, the laminate was immersed in a washing bath (an aqueous solution obtained by compounding 100 parts by weight of water with 3 parts by weight of potassium iodide), and was then dried with warm air at 60° C. (the washing and drying step).

Subsequently, an aqueous solution of a PVA-based resin (manufactured by The Nippon Synthetic Chemical Industry Co., Ltd., trade name: "Gohsefimer (trademark) Z-200," resin concentration: 3 wt %) was applied to the surface of the PVA-based resin layer of the laminate so that the thickness of an adhesive layer after heating was 90 nm. A norbornene-based resin film (manufactured by JSR Corporation, trade name: "ARTON," thickness: 35 μm, moisture permeability: 85 g/m²·24 h) was attached to the resultant, and then the whole was heated in an oven maintained at 60° C. for 5 minutes (the step D). At the time of the attachment, the moisture content per unit area in the adhesive was 0.3 mg/cm².

Thus, a polarizing film having a thickness of 3 μm was produced. In addition, the thermoplastic resin substrate at this time had a thickness of 70 μm and a moisture permeability of 50 g/m²·24 h.

Example 2-2

A polarizing film was produced in the same manner as in Example 2-1 except that the heating temperature in the step D was changed to 80° C.

Example 2-3

A polarizing film was produced in the same manner as in Example 2-1 except that a norbornene-based resin film (manufactured by ZEON CORPORATION, trade name: "ZEONOR ZB14," thickness: 70 μm, moisture permeability: 7 g/m²·24 h) was used as a cover film.

Example 3-1

A laminate produced in the same manner as in Example 1-1 was subjected to free-end uniaxial stretching in its longitudinal direction (lengthwise direction) at 1.8 times in an oven at 120° C. between rolls having different peripheral speeds (an aerial auxiliary stretching step). After that, the insolubilizing step was performed in the same manner as in Example 1-1.

Next, the resultant was immersed in a dyeing liquid having a liquid temperature of 30° C. and containing potassium iodide at an iodine concentration of 0.12 to 0.25 wt % so that the polarization degree of a polarizing film to be finally obtained was 99.98% or more (the step B). Here, a compounding ratio between iodine and potassium iodide was set to 1:7.

Next, the cross-linking step, the step C, the washing and drying step, and the step D were performed in the same manner as in Example 1-1. Thus, a polarizing film was produced. It should be noted that in the step C, the stretching was performed so that the total stretching ratio (maximum stretching ratio) including that of the aerial auxiliary stretching was 6.0 times.

Thus, a polarizing film having a thickness of 3 μm was produced. In addition, the thermoplastic resin substrate at this time had a thickness of 40 μm and a moisture permeability of 25 g/m²·24 h.

Example 3-2

A polarizing film was produced in the same manner as in Example 3-1 except that the heating temperature in the step D was changed to 80° C.

Example 3-3

A polarizing film was produced in the same manner as in Example 3-2 except that a norbornene-based resin film (manufactured by ZEON CORPORATION, trade name: "ZEONOR G film ZF14," thickness: 23 μm, moisture permeability: 27 g/m²·24 h) was used as a cover film.

Example 3-4

A polarizing film was produced in the same manner as in Example 3-2 except that a norbornene-based resin film (manufactured by JSR Corporation, trade name: "ARTON FEKP130," thickness: 40 μm, moisture permeability: 60 g/m²·24 h) was used as a cover film.

Comparative Example 1-1

A polarizing film was produced in the same manner as in Example 1-1 except that: a cellulose-based resin film (manufactured by FUJIFILM Corporation, trade name: "TD80UL," thickness: 80 μm, moisture permeability: 400 g/m²·24 h) was used as a cover film; and the heating temperature was changed to 50° C.

Comparative Example 1-2

A polarizing film was produced in the same manner as in Example 1-1 except that: a cellulose-based resin film (manufactured by FUJIFILM Corporation, trade name: "TD80UL," thickness: 80 μm, moisture permeability: 400 g/m²·24 h) was used as a cover film; and the heating temperature was changed to 80° C.

Comparative Example 2-1

A polarizing film was produced in the same manner as in Example 2-1 except that: a cellulose-based resin film (manufactured by FUJIFILM Corporation, trade name: "TD80UL," thickness: 80 μm, moisture permeability: 400 g/m²·24 h) was used as a cover film; and the heating temperature was changed to 50° C.

Comparative Example 2-2

A polarizing film was produced in the same manner as in Example 2-1 except that: a cellulose-based resin film (manufactured by FUJIFILM Corporation, trade name: "TD80UL," thickness: 80 μm, moisture permeability: 400 g/m²·24 h) was used as a cover film; and the heating temperature was changed to 90° C.

Comparative Example 3-1

A polarizing film was produced in the same manner as in Example 3-1 except that: a cellulose-based resin film (manufactured by FUJIFILM Corporation, trade name: "TD80UL," thickness: 80 μm, moisture permeability: 400 g/m²·24 h) was used as a cover film; and the heating temperature was changed to 50° C.

Comparative Example 3-2

A polarizing film was produced in the same manner as in Example 3-1 except that: a cellulose-based resin film (manufactured by FUJIFILM Corporation, trade name: "TD80UL," thickness: 80 μm, moisture permeability: 400 g/m²·24 h) was used as a cover film; and the heating temperature was changed to 80° C.

Comparative Example 4-1

A polyvinyl alcohol (PVA) film (manufactured by KURARAY CO., LTD., trade name: "VF-PS7500," thickness: 75 μm) having a polymerization degree of 2,300 and a saponification degree of 99.9% was immersed in a swelling bath (pure water) having a liquid temperature of 30° C. for 30 seconds (a swelling step).

Next, the PVA film was immersed in a dyeing liquid having a liquid temperature of 30° C. and containing potassium iodide at an iodine concentration of 0.03 to 0.05 wt % so that the polarization degree of a polarizing film to be finally obtained was 99.98% or more (the dyeing step). Here, a compounding ratio between iodine and potassium iodide was set to 1:7.

Next, the PVA film was immersed in a cross-linking bath having a liquid temperature of 30° C. (an aqueous solution of boric acid obtained by compounding 100 parts by weight of water with 3 parts by weight of potassium iodide and 3 parts by weight of boric acid) for 30 seconds (the cross-linking step).

After that, the PVA film was uniaxially stretched in its longitudinal direction (lengthwise direction) between rolls having different peripheral speeds while being immersed in an aqueous solution of boric acid having a liquid temperature of 60° C. (an aqueous solution obtained by compounding 100 parts by weight of water with 4 parts by weight of boric acid and 5 parts by weight of potassium iodide) (the stretching step). The laminate was immersed in the aqueous solution of boric acid for a time of 120 seconds, and the stretching ratio was set to 6.0 times.

After that, the PVA film was immersed in a washing bath (an aqueous solution obtained by compounding 100 parts by weight of water with 3 parts by weight of potassium iodide), and was then dried with warm air at 60° C. (the washing and drying step).

Subsequently, an aqueous solution of a PVA-based resin (manufactured by The Nippon Synthetic Chemical Industry Co., Ltd., trade name: "Gohsefimer (trademark) Z-200," resin concentration: 3 wt %) was applied to each of both surfaces of the PVA film so that the thickness of an adhesive layer after heating was 90 nm. A norbornene-based resin film (manufactured by ZEON CORPORATION, trade name: "ZEONOR ZB14," thickness: 70 μm, moisture permeability: 7 g/m²·24 h) was attached to the resultant, and then the whole was heated in an oven maintained at 80° C. for 5 minutes (the heating step). At the time of the attachment, the moisture content per unit area in the adhesive was 0.3 mg/cm².

Thus, a polarizing film having a thickness of 24 μm was produced.

Comparative Example 4-2

A polarizing film was produced in the same manner as in Example 4-1 except that: a cellulose-based resin film (manufactured by FUJIFILM Corporation, trade name: "TD80UL," thickness: 80 μm, moisture permeability: 400 g/m²·24 h) was used as a cover film; and the heating temperature was changed to 50° C.

Reference Example 1

A polarizing film was obtained in the same manner as in Example 1-1 except that the step D was not performed.

Reference Example 2

A polarizing film was obtained in the same manner as in Example 2-1 except that the step D was not performed.

Reference Example 3

A polarizing film was obtained in the same manner as in Example 3-1 except that the step D was not performed.

Reference Example 4

A polarizing film was obtained in the same manner as in Comparative Example 4-1 except that the heating step was not performed.

The polarization degree of the polarizing film obtained in each of the examples and the comparative examples was measured under such a condition that the cover film was not released and the thermoplastic resin substrate was released. It should be noted that with regard to each of Reference Example 1 and Reference Example 3, an adhesive was applied to the surface of the resultant polarizing film, a triacetylcellulose film (TAC film) having a thickness of 80 μm was attached to the resultant, the thermoplastic resin substrate was released after the attachment, and the remainder was subjected to the polarization degree measurement. With regard to Reference Example 2, the thermoplastic resin substrate was not released and the original construction was subjected to the polarization degree measurement. With regard to Reference Example 4, an adhesive was applied to each of both surfaces of the resultant polarizing film, TAC films each having a thickness of 80 μm were attached to the resultant, and the whole was subjected to the polarization degree measurement. A method of measuring the polarizing degree is as described below. Table 1 shows the results of the measurement.

(Method of Measuring Polarization Degree)

The single axis transmittance (Ts), parallel transmittance (Tp), and crossed transmittance (Tc) of a polarizing film were measured with an ultraviolet-visible spectrophotometer (manufactured by JASCO Corporation, product name: "V7100"), and then its polarization degree (P) was determined from the following equation.

$$\text{Polarization degree}(P)(\%) = \{(Tp-Tc)/(Tp+Tc)\}^{1/2} \times 100$$

It should be noted that the Ts, the Tp, and the Tc are Y values measured with the two-degree field of view (C light source) of JIS Z 8701 and subjected to visibility correction.

TABLE 1

| | | Cover film | | | Heating | Polarizing film | | |
|---|---|---|---|---|---|---|---|---|
| | Stretching mode | Constituent resin material | Moisture permeability (g/m²·24 h) | Thickness (μm) | Temperature [°C] | Ts (%) | P (%) | ΔTs |
| Example 1-1 | Underwater | Norbornene-based | 7 | 70 | 100 | 42.9 | 99.99 | 2.6 |
| Example 1-2 | Underwater | Norbornene-based | 7 | 70 | 80 | 42.1 | 99.99 | 1.8 |
| Example 1-3 | Underwater | Norbornene-based | 20 | 33 | 100 | 43.2 | 99.98 | 2.9 |
| Example 1-4 | Underwater | Norbornene-based | 27 | 23 | 100 | 42.6 | 99.99 | 2.3 |
| Example 1-5 | Underwater | Polyester-based | 29 | 25 | 100 | 42.2 | 99.97 | 1.9 |
| Example 1-6 | Underwater | Norbornene-based | 85 | 35 | 100 | 42.1 | 99.98 | 1.8 |
| Example 1-7 | Underwater | Norbornene-based | 7 | 70 | 50 | 41.1 | 99.99 | 0.8 |
| Comparative Example 1-1 | Underwater | Cellulose-based | 400 | 80 | 50 | 40.3 | 99.99 | 0.0 |
| Comparative Example 1-2 | Underwater | Cellulose-based | 400 | 80 | 80 | 40.2 | 99.99 | −0.1 |
| Reference Example 1 | Underwater | — | — | — | — | 40.3 | 99.99 | — |
| Example 2-1 | Aerial | Norbornene-based | 85 | 35 | 60 | 40.4 | 99.99 | 0.8 |
| Example 2-2 | Aerial | Norbornene-based | 85 | 35 | 80 | 40.6 | 99.99 | 1.0 |
| Example 2-3 | Aerial | Norbornene-based | 7 | 70 | 60 | 41.1 | 99.99 | 1.5 |
| Comparative Example 2-1 | Aerial | Cellulose-based | 400 | 80 | 50 | 39.6 | 99.99 | 0.0 |
| Comparative Example 2-2 | Aerial | Cellulose-based | 400 | 80 | 90 | 39.7 | 99.98 | 0.1 |
| Reference Example 2 | Aerial | — | — | — | — | 39.6 | 99.99 | — |
| Example 3-1 | Aerial + Underwater | Norbornene-based | 7 | 70 | 100 | 43.6 | 99.98 | 1.0 |
| Example 3-2 | Aerial + Underwater | Norbornene-based | 7 | 70 | 80 | 43.2 | 99.99 | 0.6 |
| Example 3-3 | Aerial + Underwater | Norbornene-based | 27 | 23 | 80 | 43.2 | 99.99 | 0.6 |
| Example 3-4 | Aerial + Underwater | Norbornene-based | 60 | 40 | 80 | 43.5 | 99.96 | 0.9 |
| Comparative Example 3-1 | Aerial + Underwater | Cellulose-based | 400 | 80 | 50 | 42.7 | 99.98 | 0.1 |
| Comparative Example 3-2 | Aerial + Underwater | Cellulose-based | 400 | 80 | 80 | 42.7 | 99.98 | 0.1 |
| Reference Example 3 | Aerial + Underwater | — | — | — | — | 42.6 | 99.98 | — |
| Comparative Example 4-1 | Underwater | Norbornene-based | 7 | 70 | 80 | 42.7 | 99.99 | 0.0 |
| Comparative Example 4-2 | Underwater | Cellulose-based | 400 | 80 | 50 | 42.5 | 99.99 | −0.2 |
| Reference Example 4 | Underwater | — | — | — | — | 12.7 | 99.99 | — |

The production of a polarizing film having an extremely high single axis transmittance and an extremely high polarization degree was attained by covering the surface of a PVA-based resin layer with a cover film having a predetermined moisture permeability and subjecting the resultant to a heating treatment. It should be noted that in Comparative Example 4-1 where the polarizing film was produced without the use of any thermoplastic resin substrate, no increase in single axis transmittance was observed even when the heating treatment was performed with a cover film having a low moisture permeability.

The upper side and lower side (thermoplastic resin substrate side) of the polarizing film obtained in Reference Example 1 were evaluated for their orientation properties with an orientation function. A method of measuring the orientation function is as described below.

A Fourier transform infrared spectrophotometer (FT-IR) (manufactured by PerkinElmer, Inc., trade name: "SPECTRUM 2000") was used as a measuring apparatus. The surface of the PVA-based resin layer was evaluated with polarized light as measurement light by attenuated total reflection (ATR) measurement. The calculation of the orientation function (f) was performed according to the following procedure.

The measurement was performed in a state where the measurement polarized light was at 0° or 90° with respect to the stretching direction.

The calculation was performed with the absorption intensity at 2941 cm$^{-1}$ of the resultant spectrum in accordance with the following equation (source: H. W. Siesler, Adv. Polym. Sci., 65, 1 (1984)). Here, a peak at 3330 cm$^{-1}$ was regarded as a reference peak, and a value for the ratio of the intensity of a peak at 2941 cm$^{-1}$ to the intensity of the peak at 3330 cm$^{-1}$ was used as the following intensity I. It should be noted that perfect orientation is achieved when f=1 and random orientation is achieved when f=0. In addition, the peak at 2941 cm$^{-1}$ is said to be absorption resulting from the vibration of the main chain (—CH$_2$—) of the PVA.

$$f = (3 < \cos^2\theta > -1)/2$$

$$= [(R-1)(R_0+2)]/[(R+2)(R_0-1)]$$

$$= (1-D)/[c(2D+1)]$$

$$= -2 \times (1-D)/(2D+1)$$

(in which,
$c = (3\cos^2\beta - 1)/2$
$\beta = 90$ deg
θ: an angle of a molecule chain with respect to a stretching direction β: an angle of a transition dipole moment with respect to a molecule chain axis $R_0 = 2 \cot^2 \beta$ $1/R = D = (I\perp)/(I//)$ (the value of D becomes greater as PET is more oriented)

$I\perp$: an absorption intensity measured by entering a measurement polarized light with its vibration direction perpendicular (90°) to a stretching direction $I//$: an absorption intensity measured by entering a measurement polarized light with its vibration direction parallel (0°) to a stretching direction)

FIG. 5 illustrates the results of the measurement together with the results of a commercially available polarizing film (polarizing film produced without the use of any substrate). Although there was no difference in orientation property between the upper side and lower side of the commercially available polarizing film, a difference in orientation property was observed between the upper side and lower side of the polarizing film of Reference Example 1 produced by using a substrate.

INDUSTRIAL APPLICABILITY

The polarizing film of the present invention is suitably used for liquid crystal panels of, for example, liquid crystal televisions, liquid crystal displays, cellular phones, digital cameras, video cameras, portable game machines, car navigation systems, copying machines, printers, facsimile machines, clockes, and microwave ovens. The polarizing film of the present invention is suitably used as an antireflection film for an organic EL device.

REFERENCE SIGNS LIST 10 laminate
11 thermoplastic resin substrate
12 polyvinyl alcohol-based resin layer

The invention claimed is:

1. A method of producing a polarizing film, comprising:
   forming a polyvinyl alcohol-based resin layer on a thermoplastic resin substrate to produce a laminate;
   dyeing the polyvinyl alcohol-based resin layer of the laminate with iodine;
   stretching the laminate; and
   covering, after the dyeing and the stretching, a surface of the polyvinyl alcohol-based resin layer of the laminate with a cover film having a moisture permeability of 100 g/m²·24 h or less, followed by heating of the laminate.

2. A method of producing a polarizing film according to claim 1, wherein the heating is performed at a temperature of 60° C. or more.

3. A method of producing a polarizing film according to claim 1, wherein the surface of the polyvinyl alcohol-based resin layer is covered with the cover film through an adhesive.

4. A method of producing a polarizing film according to claim 3, wherein the adhesive comprises an aqueous adhesive.

5. A method of producing a polarizing film according to claim 1, wherein the thermoplastic resin substrate after the stretching has a moisture permeability of 100 g/m²·24 h or less.

6. A method of producing a polarizing film according to claim 1, wherein the stretching includes underwater stretching in an aqueous solution of boric acid.

7. A method of producing a polarizing film according to claim 6, comprising subjecting the laminate to aerial stretching at 95° C. or more before the dyeing and the boric acid underwater stretching.

8. A method of producing a polarizing film according to claim 1, wherein a stretching ratio of the laminate is 5.0 times or more.

9. A method of producing a polarizing film according to claim 1, wherein the thermoplastic resin substrate is constituted of an amorphous polyethylene terephthalate-based resin.

* * * * *